US010889447B2

(12) United States Patent
Specht

(10) Patent No.: US 10,889,447 B2
(45) Date of Patent: Jan. 12, 2021

(54) CONVEYOR AND CONVEYOR SYSTEM

(71) Applicant: AVANCON SA, Riazzino (CH)

(72) Inventor: Dieter Specht, Arcegno (CH)

(73) Assignee: AVANCON SA, Riazzino (CH)

(*) Notice: Subject to any disclaimer, the term of this patent is extended or adjusted under 35 U.S.C. 154(b) by 0 days.

(21) Appl. No.: 16/389,611

(22) Filed: Apr. 19, 2019

(65) Prior Publication Data

US 2019/0359428 A1    Nov. 28, 2019

(30) Foreign Application Priority Data

May 28, 2018  (EP) .................................. 18 174 584

(51) Int. Cl.
  *B65G 15/00*  (2006.01)
  *B65G 15/22*  (2006.01)
  *B65G 23/24*  (2006.01)

(52) U.S. Cl.
  CPC ............. *B65G 23/24* (2013.01); *B65G 15/22* (2013.01)

(58) Field of Classification Search
  None
  See application file for complete search history.

(56) References Cited

U.S. PATENT DOCUMENTS

| | | | |
|---|---|---|---|
| 6,161,683 A * | 12/2000 | Wallis .................. | B65G 21/105 198/813 |
| 6,681,923 B2 * | 1/2004 | Jader ...................... | B65G 15/00 198/813 |
| 7,806,254 B2 | 10/2010 | Brayman et al. | |
| 9,457,487 B2 * | 10/2016 | Mayer ..................... | B26D 7/32 |

* cited by examiner

*Primary Examiner* — Kavel Singh
(74) *Attorney, Agent, or Firm* — Procopio, Cory, Hargreaves & Savitch LLP

(57) ABSTRACT

A conveyor comprising a first profile unit (1) and a second profile unit (2), wherein the profile units comprise a support profile (10, 20) and a side profile (11, 21) that can be releasably connected to each other to form a composed structure whose cross-sections comprise lateral openings (12, 22), at least one conveyor unit (4) that can be arranged between the two profile units, wherein each conveyor unit (4) comprises a first side wall (40) and a second side wall (41), and wherein conveying elements (44, 45) are arranged between the side walls (40, 41), wherein the side walls (40, 41) can be releasably arranged in the lateral openings (12, 22) of the profile units (1, 2) to form composed structures with a closed cross-section.

17 Claims, 6 Drawing Sheets

CONVEYOR AND CONVEYOR SYSTEM

CROSS REFERENCE TO RELATED APPLICATIONS

This Paris Convention patent application claims benefit under 35 U.S.C. § 119 and claims priority to European Patent Application No. 18 174 584.5, filed on May 28, 2018, the content of which is incorporated herein in its entirety by reference for all purposes.

TECHNICAL FIELD OF THE INVENTION

The current invention relates to a conveyor, respectively to a conveyor system for conveying individually packaged goods on idlers or belts.

DESCRIPTION OF THE RELATED ART

For example, U.S. Pat. No. 7,806,254 discloses a belt conveyor. There, belt conveyor units are arranged between to profiles, wherein each belt conveyor unit is attached to a lateral side of the profiles by means of side walls. Each belt conveyor unit is driven by a drive that is arranged below the belt conveyor unit and is attached to a bottom side of the profiles by means of a frame. The drive is connected to a driven idler of the belt conveyor unit by means of a toothed belt.

SUMMARY OF THE INVENTION

It is a task of the current invention to provide a conveyor that is versatile and flexible in use and is easy to maintain.

This task is solved by a conveyor with the features of claim 1. Further embodiments of the conveyor, as well as a conveyor system are defined by the features of further claims.

A conveyor according to the invention comprises a first profile unit extending in a conveying direction and a second profile unit extending in the conveying direction, the first profile unit and the second profile unit being arranged parallel to each other and being fixed to each other by means of at least one profile crossbeam, wherein the first profile unit comprises a support profile and a side profile that can be releasably connected to each other to form a composed structure whose cross-section comprises a first lateral opening and wherein the second profile unit comprises a support profile and a side profile that can be releasably connected to each other to form a composed structure whose cross-section comprises a second lateral opening, wherein the first lateral opening faces the second lateral opening, at least one conveyor unit that can be arranged between the first profile unit and the second profile unit, wherein each conveyor unit comprises a first side wall and a second side wall, the first side wall and the second side wall being arranged parallel to each other and wherein conveying elements are arranged between the side walls, wherein the first side wall can be releasably arranged in the first lateral opening to form a composed structure with a closed cross-section along the first side wall and wherein the second side wall can be releasably arranged in the second lateral opening to form a composed structure with a closed cross-section along the second side wall.

With such a design, the conveyor unit can easily be removed from between the two profile units. This is especially advantageous when doing maintenance or in case of the replacement of a component during operation. The quick and easy disassembly and assembly of the conveyor allows for a short down time of the whole conveyor line.

In an embodiment, a first connecting element of each support profile forms a first positive locking with a second connecting element of the corresponding side wall, a second connecting element of each side profile forms a second positive locking with a first connecting element of the corresponding side wall, and a second connecting element of each support profile forms a third positive locking with a first connecting element of the corresponding side profile. The connecting elements can be formed integrally with the corresponding profile, respectively side wall. Alternatively, the connecting elements can be attached to the corresponding profile, respectively side wall.

In an embodiment, the second positive locking comprises a tongue and groove connection, wherein one of the connecting elements comprises the tongue in the form of at least one web and the other connecting element comprises the groove in the form of at least two webs and wherein each web, in a cross-section plane perpendicular to the conveying direction, has the shape of a circular segment, having the same circle center point. The connecting element of the profile or the connecting element of the side wall can comprise the tongue, respectively the groove. The circular shape of the connecting elements allows the disassembly by a tilting motion of the side profile, respectively of the side wall.

In an embodiment, the first positive locking comprises a sliding connection, wherein each of the connecting elements comprises at least one web and wherein each web, in a cross-section plane perpendicular to the conveying direction, has the shape of a circular segment, having the same circle center point as the webs of the second positive locking. With such a design, the first positive locking can be disassembled together with the second positive locking, in one tilting motion.

In an embodiment, the third positive locking comprises a tongue and groove connection, wherein one of the connecting elements comprises the tongue in the form of a web and the other connecting element comprises the groove in the form of a bifurcated web. The tongue, respectively the groove can be formed integrally with the support profile or the side profile.

In an embodiment, all webs are formed integrally with the corresponding profile. Alternatively, some connecting elements can be attached to the corresponding profile, respectively side wall.

In an embodiment, the third positive locking is spaced apart from the contour of the profile unit and a slot is formed in the contour of the profile unit between the support profile and the side profile adjacent to the third positive locking. Alternatively, the third positive locking is a part of the contour.

In an embodiment, the profiles and/or the side walls are made from metal, selected from the group of aluminum, steel and stainless steel.

In an embodiment, the conveyor further comprises at least one fixation element selected from the group of hammer-headed or T-shaped nut and T-shaped bolt, which can be inserted into the slot and which can fix the side profile to the corresponding support profile. Alternatively, the profiles can comprise holes, threaded holes or slots, in which a fixation element can be introduced.

In an embodiment, the conveyor further comprising at least one stand, each stand comprising two poles, wherein each pole can be fixed to a corresponding profile unit by means of the at least one fixation element. The stand can be arranged between the two ends of the profile units. Alternatively, there are two stands, each arranged on one side of the profile units with respect to the conveying direction. For long conveyors, there can be three, four or more stands that are evenly distributed along the conveying direction. However, the current design allows the arrangement of any number of stands at any location along the profile units. The fixation element for connecting the support profile with the side profile can be used at the same time for the connection with the stands.

In an embodiment, the stand further comprises at least one cross beam, which fixes the two poles to each other. Alternatively, further cross beams can be used for the connection of two poles of neighboring stands.

In an embodiment, the first side wall and the second side wall of the conveyor unit are fixed to each other by means of at least one conveyor crossbeam. Alternatively, the side walls can be fixed to each other by means of the idlers.

In an embodiment, each of the side walls of the conveyor unit comprises a first section and a second section, wherein the first section of the first side wall and the first section of the second side wall are fixed to each other by means of at least one conveyor crossbeam. The second section of the first side wall and the second section of the second side wall are fixed to each other by means of at least one conveyor crossbeam. Alternatively, the two second sections can be fixed to each other by two or more crossbeams. Each second section is hinged to the corresponding first section by means of one of the conveyor crossbeams. Alternatively, the second section is hinged to the corresponding first section by means of a separate hinge element.

In an embodiment, the first side wall and the second side wall are fixed to each other by means of two conveyor crossbeams, that are mirror-symmetrically arranged to one another with respect to a plane perpendicular to the conveying direction, wherein each conveyor crossbeam comprises an extension, which extends from a side face of the conveyor crossbeam and wherein the conveyor unit further comprises at least one sliding plate, which abuts the side face and the extension of each conveyor crossbeam. Alternatively, separate fixation means can be used to fix the at least one sliding plate to the side walls. There can be two or more sliding plates that are arranged evenly spaced between the first and the second side wall.

In an embodiment, the extension of the conveyor crossbeam comprises a pivoting axis. The second segments can be hinged to the first segments by means of the pivoting axis.

In an embodiment, all conveyor crossbeams have identical cross-sections. Alternatively, the crossbeam comprising the pivoting axis can be different from the other crossbeams.

In an embodiment, the conveyor unit comprises a driven idler, an idler and a conveyor belt, which is arranged around both idlers. Two or more driven idlers or idlers can be present, and the conveyor belt can be arranged around all driven idlers, respectively idlers. Idlers can also be called rollers. Alternatively, a plurality of rollers can be provided on both of the side walls, wherein all rollers of one side wall are connected to each other and wherein at least one roller is connected to a drive unit. The rollers from one side wall can also be connected to the rollers of the other side wall. In this case, only one drive is necessary.

In one embodiment, the driven idler is rotatably mounted to the first sections of each side wall and the idler is rotatably mounted to the second sections of each side wall. Alternatively, the idler mounted to the second section of each side wall is the driven idler.

In an embodiment, the conveyor unit comprises a drive unit comprising a drive and a force transmission, wherein the force transmission comprises a toothed belt and a belt pulley, which is mounted to the driven idler. For example, a flat brushless DC motor can be used, which allows for the drive unit to be arranged within the profile units, hidden and non-accessible from the outside. Alternatively, a gear motor can be provided. With such a lean design, when a belt needs to be replaced, only the side profile from one profile unit needs to be removed. Then, the conveyor unit can be tilted about the center point of the other profile unit to remove it. Then, the tension of the mounted conveyor belt can be reduced by tilting the second segments of the side walls of the conveyor unit about the pivot axis. The belt can then be moved sideways over one of the side walls. This can be done without removing the drive, which is convenient and time saving. A new belt can then be moved sideways over one of the side walls and the second segments can be aligned with the first segments to tighten the belt. The conveyor unit can subsequently be inserted in the profile units, the same way it has been removed, only backwards. As the belt change can be performed in a relative small amount of time, it can be carried out while the conveyor is aligned with other conveyors. The control of the conveyor before the conveyor which needs a belt change can receive a signal from the control of conveyor undergoing a belt change. The conveyor undergoing a belt change is like a conveyor which is carrying a good. Thus, the preceding conveyor is stopped until the belt is changed, and the conveyor is operational again. With such a control system, only the affected conveyors are stopped. The non-affected conveyors can work normally. There is no need to stop the entire conveyor system.

In an embodiment, the driven idler comprises a centering band that is attached to a middle section of the driven idler. The centering band resulting in a bigger outside diameter of the idler, which results in a centering of the conveyor belt. Alternatively, an elevation, resulting in a bigger outside diameter, can be formed integrally with the middle section of the driven idler.

In an embodiment, the conveyor comprises its own photo sensor and its own control unit. Together with the drive unit, each conveyor can work autonomously. The length and width of the idlers, respectively of the idlers and the belts can be matched with the largest good to be transported, i.e. the largest box, carton, package or the like. A plurality of conveyors according to the invention can be assembled, one after the other, to build a flexible conveyor system, whose length and direction can be chosen very freely. The individual conveyors are connected electronically to a fieldbus system, for example an AS-interface, or a PLC or any higher-level Bus infrastructure or personal computer or other IT-system.

Like this, a zone powered conveyor, respectively a zone powered conveyor system can be provided.

Such a system is very economical, as there is no need for long and thick, respectively strong belts and big AC gear-motors with highly protected switches and the corresponding cables and fixations. Additionally, the maintenance of such a system is very easy, as each conveyor of the system can be fixed or replaced separately, which greatly reduces the downtime of the system.

The design of each conveyor, namely the design of the profile units, allow for the allocation of all required elements, such as drive, control, sensor, connectivity and their corresponding cables within said profile units. As there is no access to the above-mentioned elements from the outside, each conveyor and thus the conveyor system is very save and less prone to external interferences. Due to the small height of the conveyors, they can be installed very flexibly, e.g. on stands or directly on the floor or other building structures. Additionally, such conveyors can be installed in narrow spaces or several of such conveyors can be arranged one above the other, without taking up too much space.

The features of the above-mentioned embodiments of the conveyor can be used in any combination, unless they contradict each other.

A conveyor system according to the invention comprises at least two conveyors according to the invention. A plurality of conveyors can be arranged in line, parallel, perpendicular, at an angle, inclined or at any direction with respect to each other. Transmission elements can be installed between the conveyors to transport goods from one conveyor to another conveyor.

During operation, each conveyor unit knows whether there is a good to be transported present or not and transmits the information to at least its two adjoining neighboring conveyor units. If, a conveyor unit is loaded with a box and stopped the in the transport direction preceding conveyor unit is informed and thus only transports its goods to its end, but not further. With such local control, a lean overall control structure is possible.

BRIEF DESCRIPTION OF THE DRAWINGS

Embodiments of the current invention are described in more detail in the following with reference to the figures. These are for illustrative purposes only and are not to be construed as limiting. It shows FIG. 1 a perspective view of conveyor according to the invention.

DETAILED DESCRIPTION OF THE INVENTION

Figure 1:
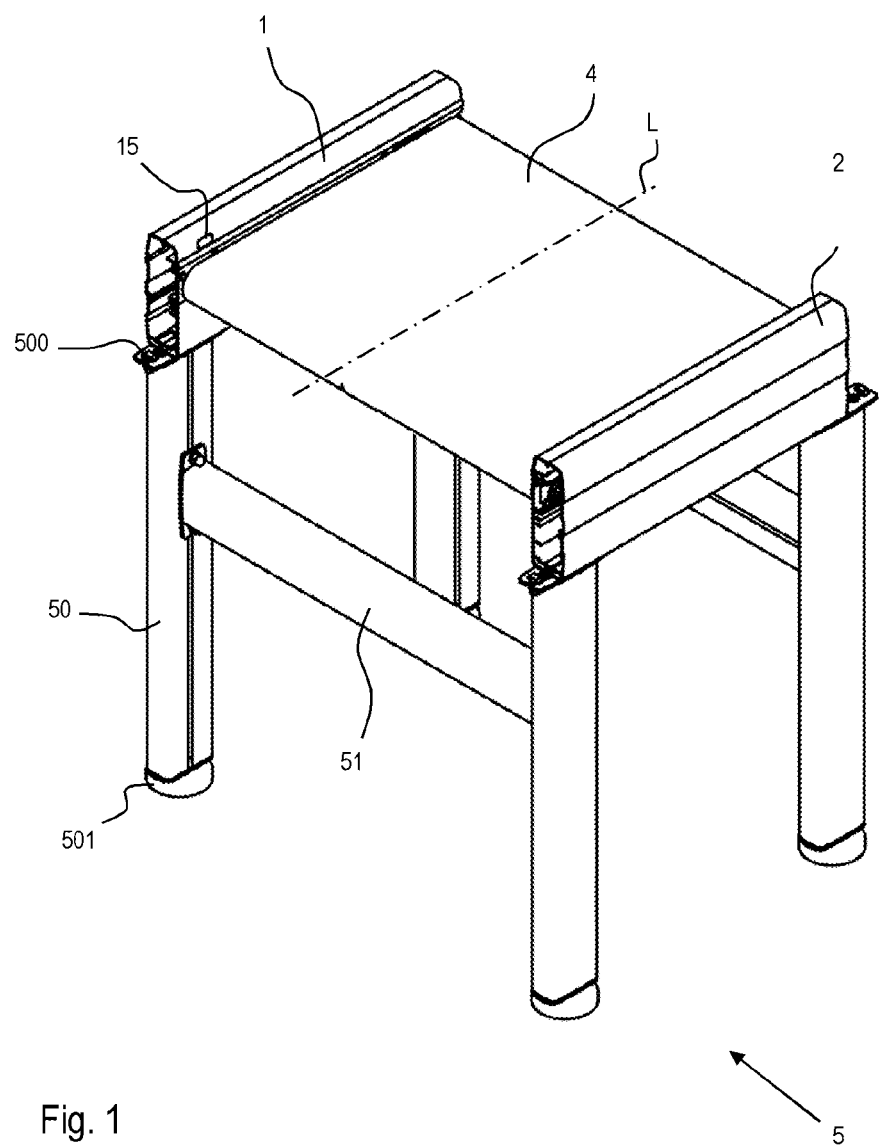

FIG. 1 shows a perspective view of conveyor according to the invention. The conveyor comprises a first profile unit 1 and a second profile unit 2 that are parallel to each other and that extend along a conveying direction L. A conveyor unit 4 that extends along the length of the profile units is arranged between the two profile units. A sensor 15 is arranged in one end region of each profile unit. A stand 5 is arranged at each end of the profile units 1, 2. Each stand 5 comprises two poles 50 that are connected to each other by means of a stand crossbeam 51. Each pole 50 comprises a reception 500 at its upper end and a foot 501 at its lower end. The ends in the conveying direction of each profile unit 1, 2 it received in the reception 500 of the corresponding pole 50. Each foot 501 can be extended and thus, can be used to adjust the height of the stand 5, allowing the adjustment of the position and the alignment of the conveyor unit 4.

Figure 2:
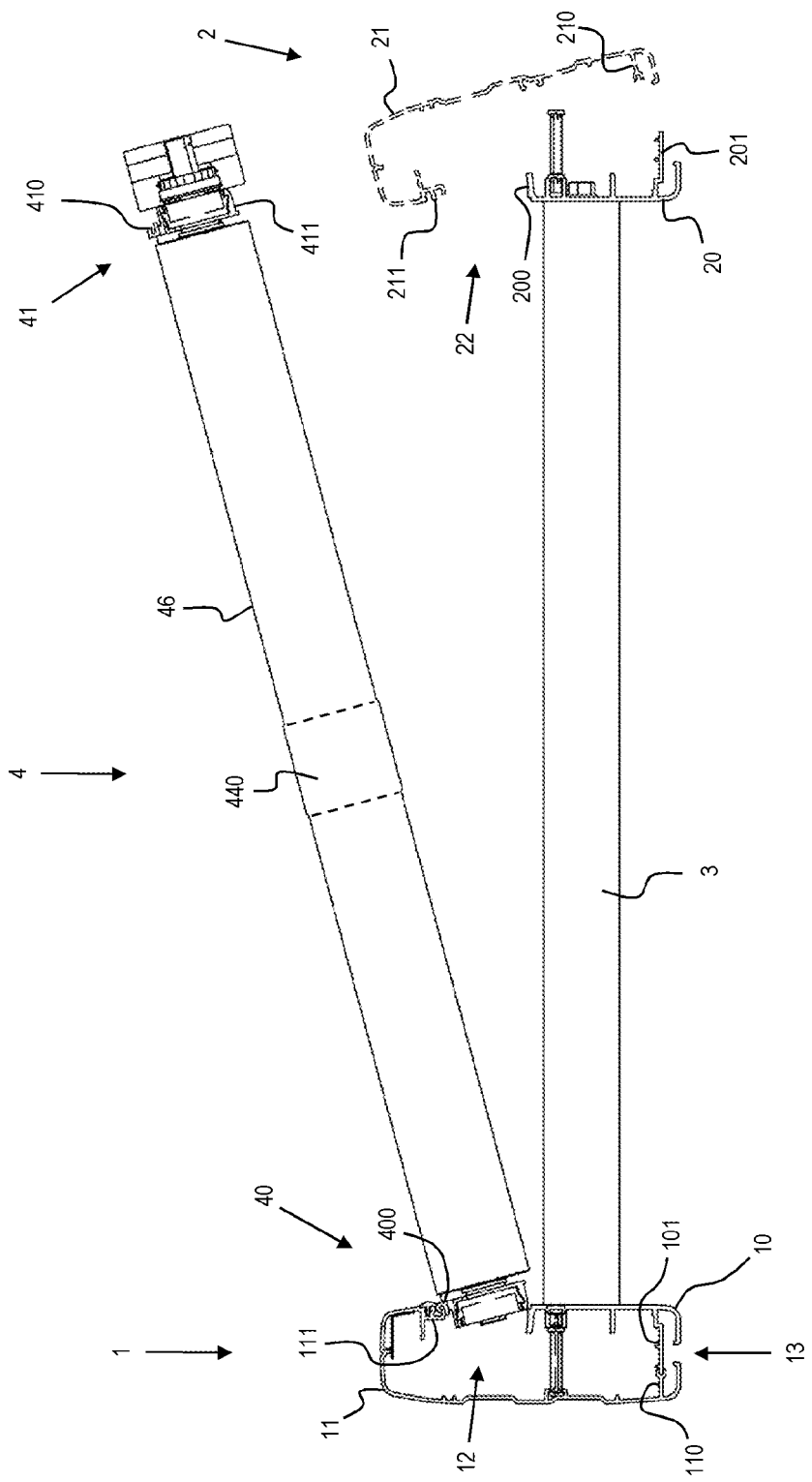
FIG. 2 a front view of the conveyor of FIG. 1 during the insertion/removal of the conveyor unit.
Figure 3:
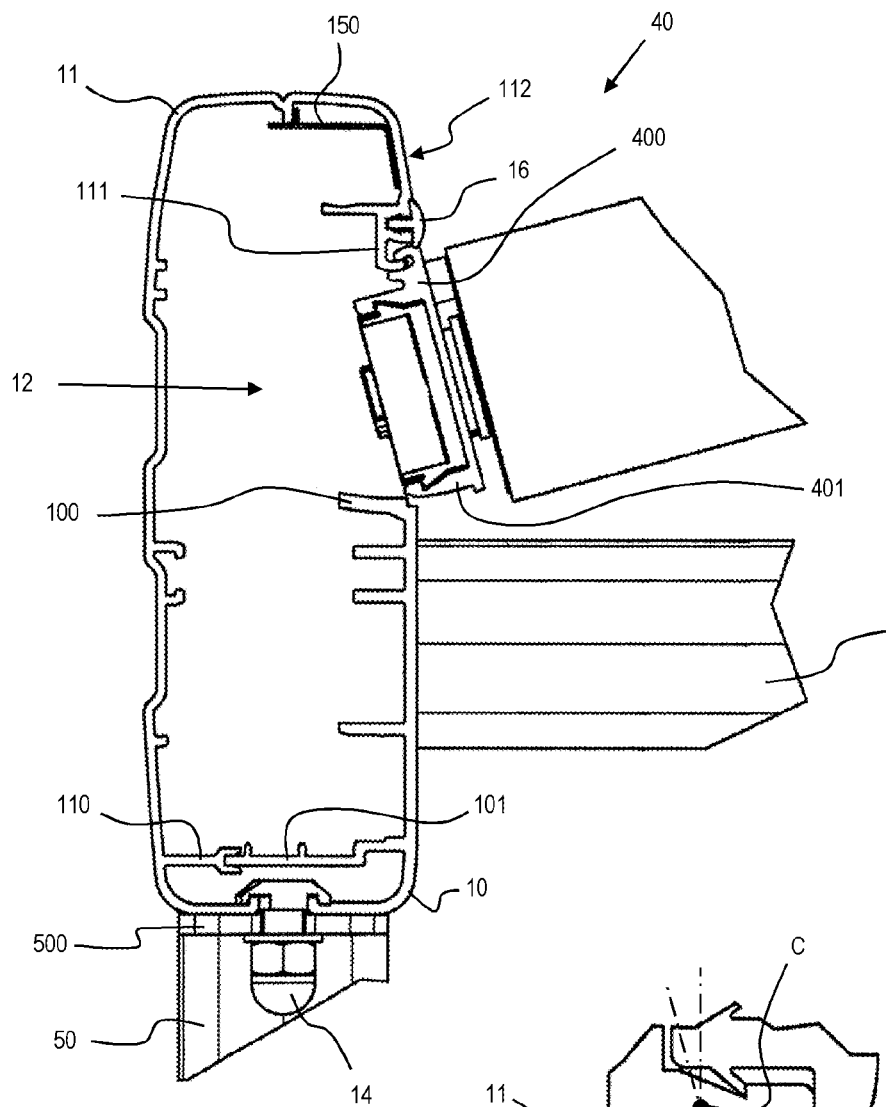
FIG. 3 a detailed view of the first profile unit of FIG. 2.
Figure 4:
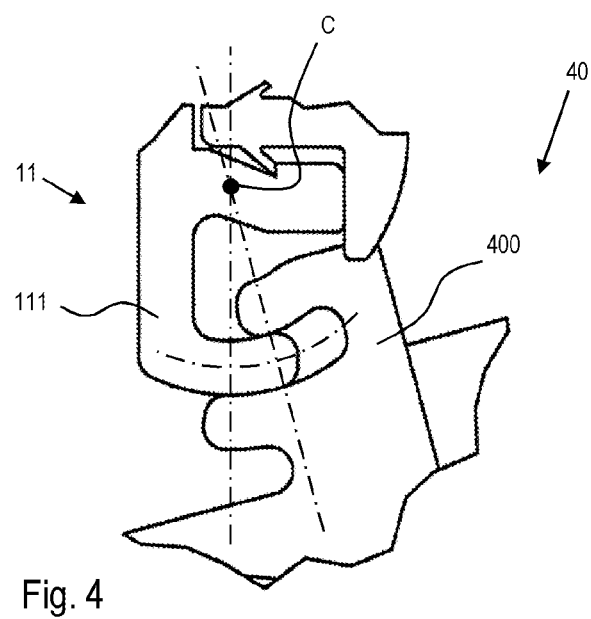
FIG. 4 a detailed view of the connecting elements of FIG. 3.

FIG. 2 shows a front view of the conveyor of FIG. 1 during the insertion/removal of the conveyor unit 4, FIG. 3 shows a detailed view of the first profile unit 1 of FIG. 2 and FIG. 4 shows a detailed view of the connecting elements of FIG. 3. The first profile unit 1 comprises a support profile 10 and a side profile 11. In the intended use position, the support profile 10 comprises an essentially vertical section with some horizontal webs extending towards the inside of the first profile unit 1 and an essentially horizontal section at its lower end. At the upper end of the vertical section, an essentially horizontal web forms a first connecting element 100. Adjacent to the horizontal section at the lower end, a horizontal web forms a second connecting element 101. In the intended use position, the side profile 11 comprises an essentially vertical section with some horizontal webs extending towards the inside of the first profile unit 1, an essentially horizontal section at its lower end and at its upper end and an essentially vertical section adjacent to the horizontal section at the upper end. Adjacent to the horizontal section at the lower end, a horizontal bifurcated web forms a first connecting element 110. At the lower end of the vertical section adjacent to the upper horizontal section, an essentially horizontal web extending towards the outside of the first profile unit 1 forms a second connecting element 111. Adjacent to the second connecting element 111, a slot that is accessible from the outside is formed in the side profile 11. A guiding profile 16 can be arranged within the slot along the entire length of the first profile unit 1. The support profile 10 and the side profile 11 are releasably connected to each other by means of a tongue and groove connection, wherein the support profile 10 comprises the tongue 101 as the connecting element and wherein the side profile 11 comprises the groove 110 as the connecting element. The tongue 101 is a single web that is formed integrally with the support frame 10 and the groove is a bifurcated web that is formed integrally with the side profile 11. The cross-section of the first profile unit 1 comprises a lateral opening 12. The lateral opening 12 is defined on the side of the support profile 10 by a connecting element in the form of a sliding web 100 and on the side of the side profile 11 by a connecting element in the form of a tongue 111. Both, the sliding web 100 and the tongue are single webs that are formed integrally with the corresponding profile. Correspondingly, the second profile unit 2 comprises a support profile 20 and a side profile 21, wherein the support profile 10 comprises the tongue 201 for the connection to the groove 210 of the side profile 21 and wherein the tongue 211 of the side profile 21 and the sliding web 200 define the lateral opening 22 of the second profile unit 2. The first profile unit 1 is connected to the second profile unit 2 by means of a profile crossbeam 3. On each side, the profile crossbeam 3 is fixed to the corresponding support profile 10, 20 by means of screws. The conveyor unit 4 is arranged between the first profile unit 1 and the second profile unit 2, wherein the first side wall 40 can be arranged in the lateral opening 12 of the first profile unit 1 and wherein the second side wall 41 can be arranged in the lateral opening 22 of the second profile unit 2. The first connecting element 100 the first support profile 10 forms a first positive locking with a second connecting element 401 of the first side wall 40. The first connecting element 100 of the first support profile 10 being a web that extends towards the inside of the first profile unit 1 and has the shape of a circular segment in a cross-section plane perpendicular to the conveying direction L. The second connecting element 111 of the first side profile 11 forms a second positive locking with a first connecting element 400 of the first side wall 40. The second connecting element 111 of the first side profile 11 being a web that extends towards the outside of the first profile unit 1 and has the shape of a circular segment in a cross-section plane perpendicular to the conveying direction L. The web 100 of the first support profile 10 having the same circle center point C as the web 111 of the first side profile 11. The first connecting element 400 of the first side wall 40 being a bifurcated web that extends towards the outside of the conveying unit 4 and both web parts have the shape of a circular segment in a cross-section plane perpendicular to the conveying direction L. The second connecting element 401 of the first side wall 40 being a single web that extends towards the outside of the conveying unit 4 and has the shape of a circular segment in a cross-section plane perpendicular to the conveying direction L. The bifurcated web 400 of the first side wall 40 and the single web 401 of the first side wall 40 having the same circle center point C as the web 100 of the first support profile 10 and the web 111 of the first side profile 11. The second profile unit 2 is designed symmetrically to the first profile unit 1 with respect to a vertical middle plane of the conveyor. Thus, the support profiles 10, 20, including their connecting elements 100, 200; 101, 201 and the side profiles 11, 21 including their connecting elements 110, 210; 111, 211 are also designed symmetrically to each other. Therefore, the first side wall 40 and the second side wall 41 of the conveyor unit 4 are also designed symmetrically to each other with respect to the vertical middle plane of the conveyor. Thus, the connecting elements 400, 410; 401, 411 are also designed symmetrically. There is a cutout 112 in the side profile 11 of the first profile unit 1, in a part of the side profile 11 adjacent to the second connecting element 111. A window 150 is arranged in and behind the cutout 112. A sensor 15 can be arranged behind the window 150 within the first profile unit 1. For example, a photo sensor can be provided to detect the presence of a good to be transported. Common photo sensor arrangements, such as through-beam arrangements, reflective arrangements or diffuse arrangements can be foreseen. In the case of a through-beam arrangement, the second profile unit also comprises a window, wherein the source is arranged in one of the profile units and wherein the sensor is arranged in the other profile unit. In a reflective or diffuse arrangement, the source and the sensor are arranged in one of the profile units and the other profile unit is windowless but might comprise a reflector. When assembled, the tongue 101 of the support profile 10 rests in the groove 110 of the side profile 11 and there is a slot 13 between the lower horizontal section of the support profile 10 and the side profile 11. The two profiles 10, 11 can be fixed to each other by means of a T-headed screw 14 that can be inserted in the slot 13. With the same screw 14 or with additional screws 14 the first profile unit 1 can be fixed to the reception 500 of the pole 50 of the stand 5.

To remove a conveyor unit 4 from the conveyor, i.e. from between the first profile unit 1 and the second profile unit 2, as shown for example in FIG. 2, the following steps are required:

removing the T-headed screws connecting the support profile and the side profile of one profile unit,
removing the side profile by tilting it upwards,
removing the conveyor unit by tilting it upwards.

As the first and second profile units 1, 2 and the side walls 40, 41 of the conveyor unit 4 are symmetrical, the above steps can be carried out on both, the first and the second profile unit 1, 2. Like so, a defective conveyor unit 4 can be removed or replaced by a working conveyor unit 4 very easily and in very short time, which drastically reduces the down time of the conveyor.

Figure 5:
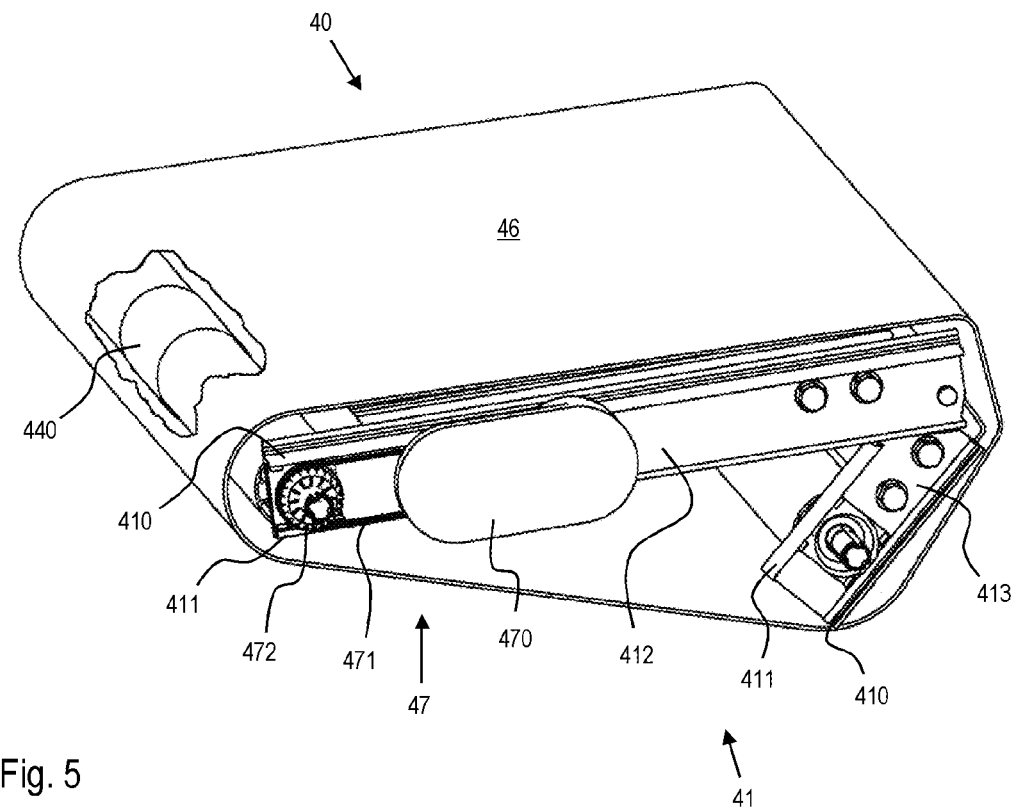
FIG. 5 a perspective view of the conveyor unit of FIG. 1 with a relaxed conveyor belt.
Figure 6:
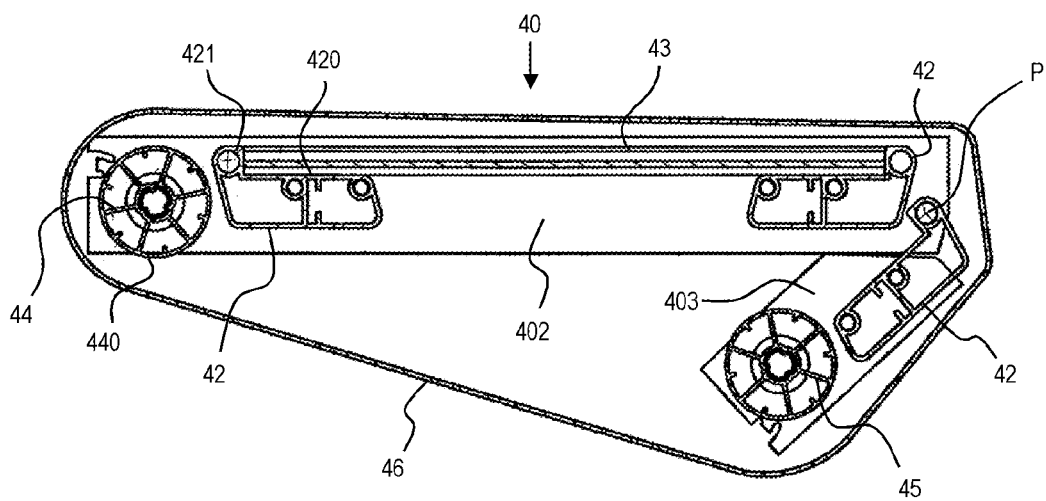
FIG. 6 a section view of the conveyor unit of FIG. 5.

FIG. 5 shows a perspective view of the conveyor unit 4 of FIG. 1 with a relaxed conveyor belt 46 and FIG. 6 shows a section view of the conveyor unit 4 of FIG. 5. The conveyor unit 4 comprises a first side wall 40 and a second side wall 41, wherein the two side walls are built symmetrically with respect to a vertical middle plane of the conveyor, parallel to the conveying direction L. Each side wall 40, 41 comprises a first segment 412 and a second segment 413, wherein the second segment 413 is hinged to the first segment 412, allowing a tilting motion of the second segment 413 from a first position, where the second segment 413 is aligned with the first segment 412 to a second position, where the second segment 413 is tilted and arranged at an angle with respect to the first segment 412. Both segments 412, 413 comprise the first connecting element 410 at its upper end and the second connecting element 411 at its lower end. The first segment 402 of the first side wall 40 and the first segment 412 of the second side wall 41 are fixed to each other by means of two identical conveyor crossbeams 42. The two conveyor crossbeams 42 are arranged symmetrically to each other with respect to a plane perpendicular to the conveying direction L. The segments 40, 41 are screwed to the cross beams 42. The second segment 403 of the first side wall 40 and the second segment 413 of the second side wall 41 are fixed to each other by means of a further conveyor crossbeam 42, which comprises a cross-section that is identical to the one of the other crossbeams. Each crossbeam 42 comprises an essentially rectangular closed profile, wherein on a first side face 420 an extension 421 is arranged. The extension 421 comprises a reception for a shaft and defines the pivoting axis P of the hinged second segments 403, 413. The crossbeams 42 comprise threaded sockets that are formed integrally with the crossbeam profiles. The segments are screwed to the crossbeams. A driven idler 45 is arranged in one end region of the first segments 402, 412 adjacent and parallel to the first crossbeam 42. The second crossbeam 42 being arranged in the other end region of the first segments 402, 412. A centering band 440 is arranged in the middle of the driven idler 44, on its circumference. An idler 46 is arranged in one end region of the second segments 403, 413 adjacent and parallel to the third crossbeam 42, that is arranged at the other end region of the second segments 403, 413. When the second sections 403, 413 are tilted, a conveyor belt 46 can be pushed sideways over the two idlers 44, 45. When the second sections 403, 413 are aligned with the first segments 402, 412, the conveyor belt 46 is tightened. Common additional tightening means might be provided as well. The crossbeams 42 connecting the two first segments 402, 412 are arranged within the conveyor belt 46 as such, that the first side face 420 is parallel to the inside surface of the tightened conveyor belt 46 and that the extension is facing towards the inside surface of the conveyor belt 46. Sliding plates 43 are arranged on the first side faces 420 of the crossbeams 42, abutting the extensions 421 on each of their ends with respect to the conveying direction L. The extensions 421 and the sliding plates 43 can be arranged tight-fitted to the inside surface of the belt 46 or with a clearance. In the aligned state, the crossbeam 42 connecting the second segments 403, 413 is arranged as such, that the side face of the crossbeam 42 opposite to the first side face 420 is collinear to the surface of the sliding plate 43 facing the conveyor belt 46. A drive unit 47 is arranged on the second side wall 41. The drive unit 47 comprises a drive 470, a toothed belt 471 and a belt pulley 472, wherein the belt pulley 472 is attached to a shaft of the driven idler 44 and the toothed belt 471 connects the drive 470 to the belt pulley 472. To be able to tighten the toothed belt 471, the position of the drive 470 with respect to the conveying direction L is adjustable.

Figure 7:
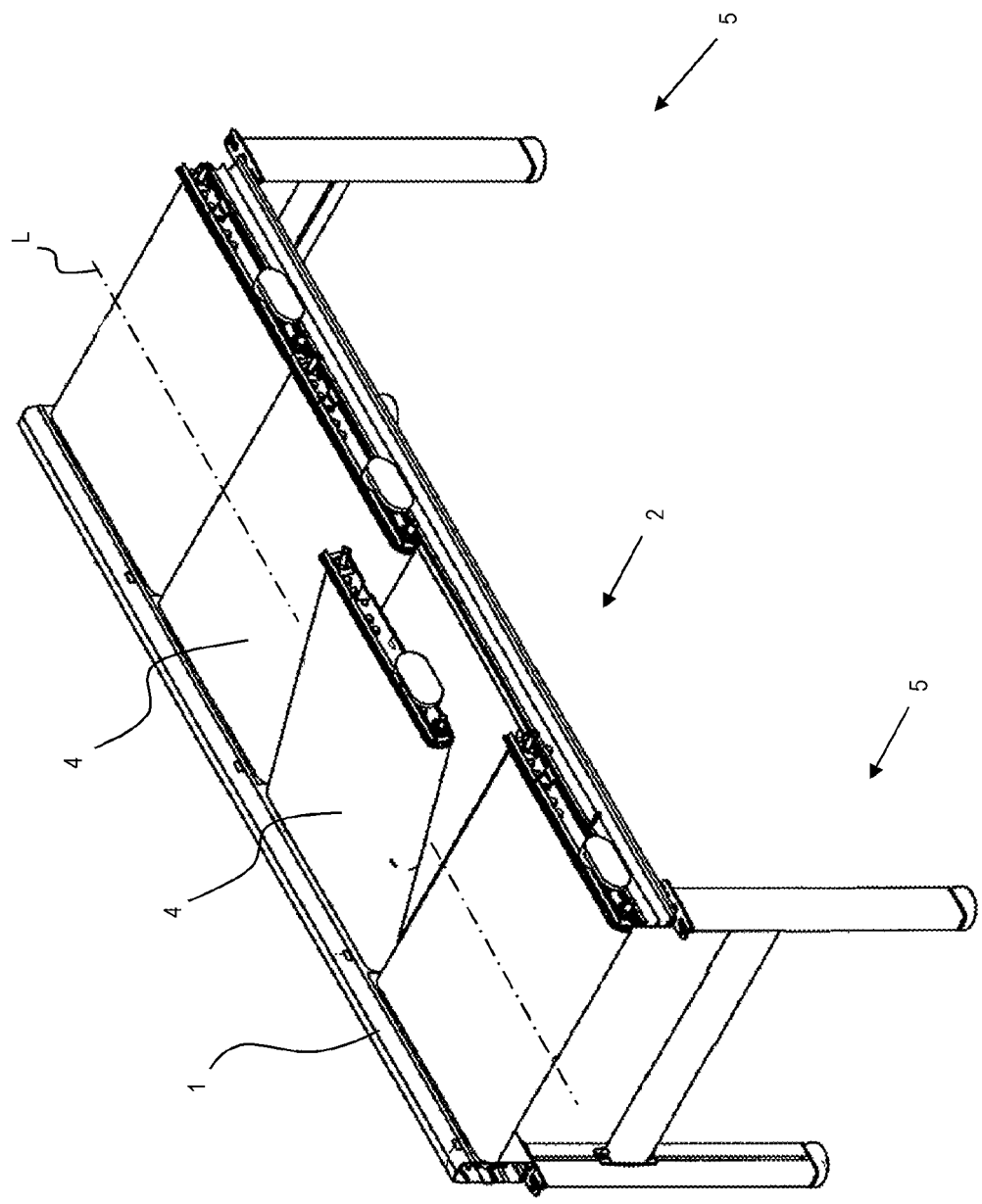
FIG. 7 a perspective view of a conveyor with several conveyor units.

FIG. 7 shows a perspective view of a conveyor with several conveyor units 4 that are arranged between common first and second profile units 1, 2. The second profile unit 2 being depicted without its side profile and one of the conveyor units 4 being tilted upwards for its removal. Any number of conveyor units 4 can be arranged between the two profile units 1, 2. There can be two, three, four, or more conveyor units 4. The length of each conveyor unit 4 can be adjusted to the length of the goods to be transported, therefore, the length of the profile units is a multiple of the length of conveyor units 4. For handling reasons, the length of the profile units 1, 2 ranges from 40 cm to 300 cm, preferably from 60 cm to 240 cm. However, other lengths of shorter or longer profile units 1, 2 are not excluded.

Figure 8:
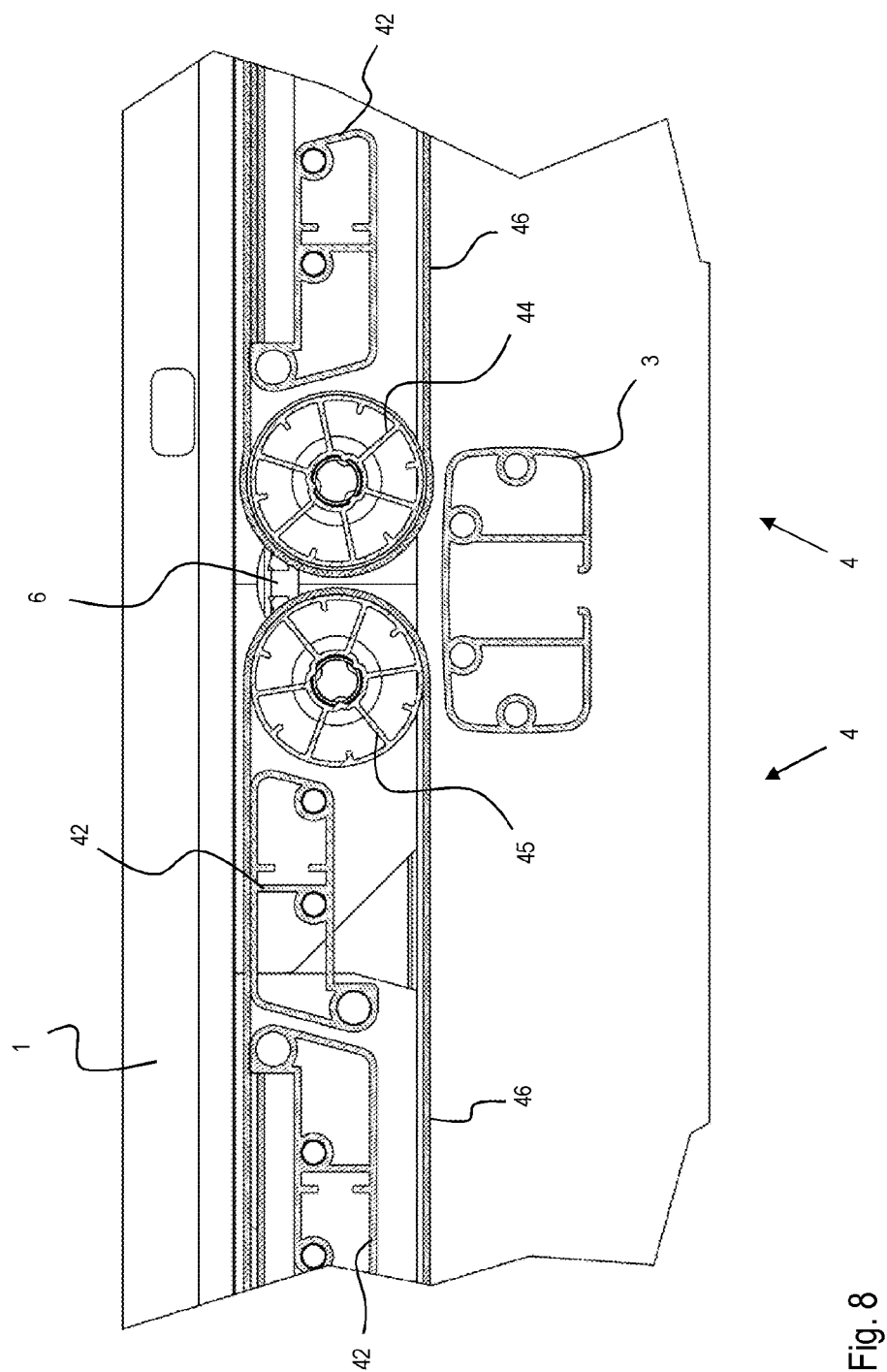
FIG. 8 a detailed cross section view of two adjoining conveyor units of FIG. 7.

FIG. 8 shows a detailed cross section view of two adjoining conveyor units 4 of FIG. 7. A bridge element 6 is arranged between two adjoining conveyor units 4. The bridge element 6 prevents the goods to be transported from entering the space between two adjoin conveyor units 4 and comprises a sliding plate, whose upper surface is aligned with the upper surface of the conveyor belts 46 and a fixation element, by means of which the bridge element 6 is fixed to the side walls 40, 41 of one of the conveyor units 4.

REFERENCE SIGNS LIST

1 Profile unit
10 Support profile
100 Connecting element
101 Connecting element
11 Side profile
110 Connecting element
111 Connecting element
112 Cutout
12 Opening
13 Slot
14 Fixation element
15 Sensor
150 Sensor window
16 Guiding profile
2 Profile unit
20 Support profile
21 Side profile
22 Opening
3 Profile crossbeam
4 Conveyor unit
40 Side wall
400 Connecting element
401 Connecting element
402 Segment
403 Segment
41 Side wall
410 Connecting element
411 Connecting element
412 Segment
413 Segment
42 Conveyor crossbeam
420 Side face
421 Extension
43 Sliding plate
44 Driven idler
440 Centering band
45 Idler
46 Conveyor belt
47 Drive unit
470 Drive
471 Toothed belt
472 Belt pulley
5 Stand
50 Pole
500 Reception
501 Foot
51 Stand crossbeam
6 Bridge element
L Conveying direction
C Center point
P Pivoting axis

The invention claimed is:

1. A conveyor comprising
a first profile unit (1) extending in a conveying direction (L) and a second profile unit (2) extending in the conveying direction (L), the first profile unit (1) and the second profile unit (2) being arranged parallel to each other and being fixed to each other by means of at least one profile crossbeam (3), wherein the first profile unit (1) comprises a support profile (10) and a side profile (11) that can be releasably connected to each other to form a composed structure (10, 11) whose cross-section comprises a first lateral opening (12) and wherein the second profile unit (2) comprises a support profile (20) and a side profile (21) that can be releasably connected to each other to form a composed structure (20, 21) whose cross-section comprises a second lateral opening (22), wherein the first lateral opening (12) faces the second lateral opening (22),
at least one conveyor unit (4) that can be arranged between the first profile unit (1) and the second profile unit (2), wherein each conveyor unit (4) comprises a first side wall (40) and a second side wall (41), the first side wall (40) and the second side wall (41) being arranged parallel to each other, and wherein conveying elements (44, 45) are arranged between the side walls (40, 41),
wherein
the first side wall (40) can be releasably arranged in the first lateral opening (12) to form a composed structure (10, 11, 40) with a closed cross-section along the first side wall (40) wherein
the second side wall (41) can be releasably arranged in the second lateral opening (22) to form a composed structure (20, 21, 41) with a closed cross-section along the second side wall (41), characterized in that
a first connecting element (100, 200) of each support profile (10, 20) forms a first positive locking with a second connecting element (401, 411) of the corresponding side wall (40, 41),
a second connecting element (111, 211) of each side profile (11, 21) forms a second positive locking with a first connecting element (400, 410) of the corresponding side wall (40, 41), and
a second connecting element (101, 201) of each support profile (10, 20) forms a third positive locking with a first connecting element (110, 210) of the corresponding side profile (11, 21).

2. The conveyor according to claim 1, wherein the second positive locking comprises a tongue and groove connection, wherein one of the connecting elements (111, 211; 400, 410) comprises the tongue in the form of at least one web and the other connecting element comprises the groove in the form of at least two webs and wherein each web, in a cross-section plane perpendicular to the conveying direction, has the shape of a circular segment, having the same circle center point.

3. The conveyor according to claim 2, wherein the first positive locking comprises a sliding connection, wherein each of the connecting elements (100, 200; 401, 411) comprises at least one web and wherein each web, in a cross-section plane perpendicular to the conveying direction, has the shape of a circular segment, having the same circle center point as the webs of the second positive locking.

4. The conveyor according claim 1, wherein the third positive locking comprises a tongue and groove connection, wherein one of the connecting elements (101, 201; 110, 210) comprises the tongue in the form of a web and the other connecting element comprises the groove in the form of a bifurcated web.

5. The conveyor according to claim 2, wherein all webs are formed integrally with the corresponding profile.

6. The conveyor according to claim 4, wherein the third positive locking is spaced apart from the contour of the profile unit (1, 2) and wherein a slot (13, 23) is formed in the contour of the profile unit (1, 2) between the support profile (10, 20) and the side profile (11, 21) adjacent to the third positive locking.

7. The conveyor according to claim 1, wherein the profiles and/or the side walls are made from metal, selected from the group of aluminum, steel and stainless steel.

8. The conveyor according to claim 5, wherein the conveyor further comprises at least one fixation element (14) selected from the group of hammer-headed or T-shaped nut and T-shaped bolt, which can be inserted into the slot (13, 23) and which can fix the side profile (11, 21) to the corresponding support profile (10,20).

9. The conveyor according to claim 8, further comprising at least one stand (5), each stand comprising two poles (50), wherein each pole (50) can be fixed to a corresponding profile unit (1, 2) by means of the at least one fixation element (14).

10. The conveyor according to claim 1, wherein each of the side walls (40,41) of the conveyor unit (4) comprises a first section (400) and a second section (401),
wherein the first section (400) of the first side wall (40) and the first section (410) of the second side wall (41) are fixed to each other by means of at least one conveyor crossbeam (42),
wherein the second section (401) of the first side wall (40) and the second section (411) of the second side wall (41) are fixed to each other by means of at least one conveyor crossbeam (42), and
wherein each second section (401) is hinged to the corresponding first section (400) by means of one of the conveyor crossbeams (42).

11. The conveyor according to claim 10, wherein the first side wall (40) and the second side wall (41) are fixed to each other by means of two conveyor crossbeams (42), that are mirror-symmetrically arranged to one another with respect to a plane perpendicular to the conveying direction, wherein each conveyor crossbeam (42) comprises an extension (421), which extends from a side face (420) of the conveyor crossbeam (42) and wherein the conveyor unit (4) further comprises at least one sliding plate (43), which abuts the side face (420) and the extension (421) of each conveyor crossbeam (42).

12. The conveyor according to claim 11, wherein the extension (421) of the conveyor crossbeam (42) comprises a pivoting axis (P).

13. The conveyor according to claim 10, wherein all conveyor crossbeams (42) have identical cross-sections.

14. The conveyor according to claim 1, wherein the conveyor unit (4) comprises a driven idler (44), an idler (45) and a conveyor belt (46), which is arranged around both idlers (44,45).

15. The conveyor according to claim 14, wherein the driven idler (44) is rotatably mounted to the first sections (400, 410) of each side wall (40, 41) and wherein the idler (45) is rotatably mounted to the second sections (401, 411) of each side wall (40, 41).

16. The conveyor according to claim 14, wherein the conveyor unit (4) comprises a drive unit (47) comprising a drive (470) and a force transmission (471, 472), wherein the force transmission comprises a toothed belt (471) and a belt pulley (472), which is mounted to the driven idler (44), wherein the drive unit (47) with all its components are arranged within the first profile unit (1) and/or within the second profile unit (2).

17. A conveyor system comprising at least two conveyors according to claim 1, wherein all conveyors can work independently from one another.

* * * * *